United States Patent [19]

Baker et al.

[11] 4,016,759
[45] Apr. 12, 1977

[54] FLUID FLOWMETER

[75] Inventors: William C. Baker, Hampton; John J. Chapman, Virginia Beach, both of Va.

[73] Assignee: Teledyne, Inc., Los Angeles, Calif.

[22] Filed: Sept. 18, 1975

[21] Appl. No.: 614,654

[52] U.S. Cl. .............................................. 73/204
[51] Int. Cl.² ......................................... G01F 1/68
[58] Field of Search ..................................... 73/204

[56] References Cited

UNITED STATES PATENTS

| | | | |
|---|---|---|---|
| 2,446,283 | 8/1948 | Hulsberg | 73/204 |
| 2,729,976 | 1/1956 | Laub | 73/204 |
| 2,994,222 | 8/1961 | Laub | 73/204 |
| 3,116,639 | 1/1964 | Bird | 73/204 |
| 3,181,357 | 5/1965 | Benson | 73/204 |
| 3,363,462 | 1/1968 | Sabin | 73/204 |
| 3,680,377 | 8/1972 | Lightner | 73/204 |
| 3,942,378 | 3/1976 | Olmstead | 73/204 |

*Primary Examiner*—Herbert Goldstein
*Attorney, Agent, or Firm*—Cushman, Darby & Cushman

[57] ABSTRACT

Apparatus for measuring the flow of fluids by thermal means. A flow meter of the heated conduit type is operated in a constant temperature mode to produce two output signals, one proportional to the differential temperature between two points in the fluid and the other proportional to the power required to maintain that temperature differential constant. The power is a measure of the mass flow and the heat capacity of the fluid.

21 Claims, 12 Drawing Figures

FLUID FLOWMETER

BACKGROUND OF THE INVENTION

The concept of heating a fluid stream and sensing its temperature to thereby obtain a measure of fluid flow it well known. For example, in U.S. Pat. No. 946,886 issued on Jan. 18, 1910 to Carl C. Thomas, there is disclosed an arrangement wherein a heater is inserted into a flow stream, and temperature sensors are located upstream and downstream of the heater. In one mode of operation Thomas measures the heater current necessary to maintain a constant temperature different between the two sensors. However, since Thomas relies on the movement of fluid between the two sensing points to establish the temperature differential, his arrangement is inapplicable to situations wherein the flow approaches zero.

A significant advance in thermal flowmeters is disclosed in U.S. Pat. No. 3,181,357 which issued to James M. Benson on May 4, 1965 wherein the actual flow conduit serves as both the heat source and a portion of the temperature sensing arrangement. Benson inductively couples a constant amount of power into the conduit and uses the conduit as one element of a thermocouple to measure changes in fluid temperature as heat transfers between the heated conduit and the fluid stream. The Benson flowmeter is inherently non-linear because the measured variable is differential temperature which is inversely proportional to flow. This significantly limits its usefulness and its range of measurement. Furthermore, the Benson device requires a relatively high operating temperature in the conduit for adequate flow sensitivity (typically 213° C. above ambient for a 10 mvdc thermocouple signal) which prevents its use with some fluids, notably liquids with boiling points below 240° C. and gases whose physical properties change adversely at elevated temperatures.

Also known are thermal devices, commonly referred to as "hot wire anemometers", which have been made to operate in the constant temperature mode and used to measure fluid flow by placement inside a conduit. Such devices measure the cooling effect of a fluid on a heated body (wire, thermocouple, etc.,) submerged in the fluid stream; that is the velocity of the fluid at the point of insertion. The calibration of the device is strongly dependent on the thermal conductivity of the fluid and the relationship between power and flow is not linear. Furthermore, this type of thermal device is subject to damage from streaming debris in the conduit, and in the case where the fluid is combustible, an ignition problem is presented.

SUMMARY OF THE INVENTION

The present invention pertains to a thermal flowmeter of the heated conduit type operating in a constant temperature mode which overcomes the aforementioned disadvantages and has the additional advantages of inherent linear output, increased range, reduced operating temperature, reduced effect of position on accuracy, reduced effect of temperature on the fluid heat capacity, and reduced noise on the output signal.

Briefly, the invention comprises a flowmeter having a conduit through which fluid passes. The conduit is mounted with respect to a heat sink such that it is divided into separate sections. One section is heated by a variable power source. Temperature sensing devices are associated with both the heated and non-heated sections of the conduit. The outputs of the sensing devices are employed to control the power source in order to maintain a constant temperature differential between these outputs. The amount of power required to maintain the constant differential is related to the mass flowrate through the conduit. Consequently, by monitoring the power input to the flowmeter, the mass flowrate is determined.

The invention will become more fully apparent when considered in light of the following detailed description of illustrative embodiments of the invention and from the appended claims.

The illustrative embodiments may be best understood by reference to the accompanying drawings, wherein.

Prior to the detailed description of the illustrative embodiments of the invention, a brief discussion of the basic principle and considerations involved in the present invention will be outlined.

The relationship that exists between fluid flow and the several variables is given by the formula:

$$M \sim \frac{H}{C_p \Delta t} \sim \frac{P}{C_p \Delta t}$$

where $M$ is the mass flowrate, $H$ is the heat input per unit time, $C_p$ is the heat capacity of the fluid at constant pressure, $\Delta t$ is the temperature differential between two points in the fluid located so as to reflect the effect of the heat input of the fluid stream, and $P$ is the electrical equivalent (power) of the heat input. This formula shows that if $\Delta t$ and $C_p$ are maintained constant, then $M$ varies directly with $H$ (or $P$) whereas, if $H$ and $C_p$ are maintained constant, $M$ varies inversely with $\Delta t$.

Figure 1:
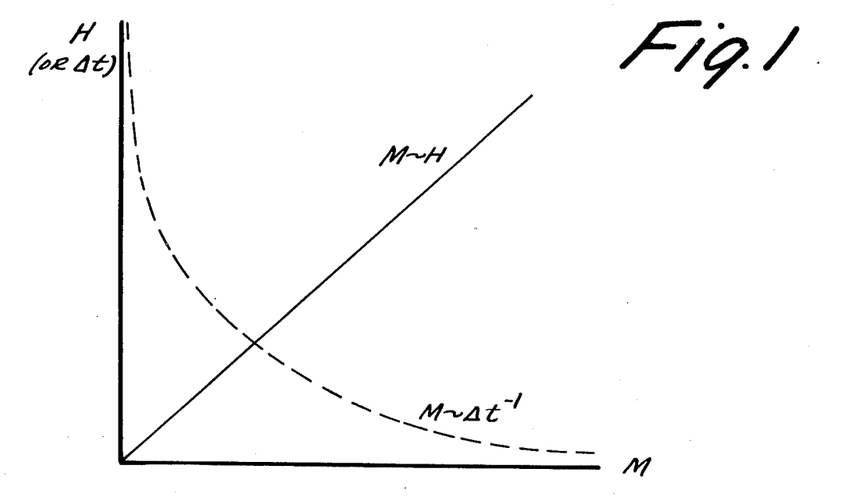
FIG. 1. is a plot comprising mass flowrates measured by constant temperature and constant power devices.

The present invention relates to a constant temperature flowmeter wherein $\Delta t$ and $C_p$ are maintained constant. FIG. 1 illustrates by a solid line the linearity of the mass flowrate measurable by such an arrangement, whereas for comparative purposes there is illustrated in broken lines the non-linear relationship which occurs with a constant power flowmeter of the type disclosed, for example, in the Benson U.S. Pat. No. 3,181,357. This plot demonstrates the constant sensitivity obtainable with a constant temperature flowmeter as compared with the decreased sensitivity at higher flows encountered with a constant power flowmeter. Obviously, the latter type of flowmeter is limited in its useful range.

The heat capacity term Cp in the above formula cannot indiscriminately be considered a constant since it varies with fluid composition, temperature, and pressure. In most fluids the variation with pressure, even over several decades, is small and can be neglected. The variation with temperature, however, can be quite large for some fluids. For example, the Cp for carbon dioxide varies 19.5% for a 200° C. change, and 200° C. is typical of the variation due to flow in the operating temperature of the conduit of some constant power flowmeters. By operating the flowmeter in a constant temperature mode, these variations in Cp due to flow are eliminated. It is true that Cp still varies with changes in ambient temperature. However, such variations are normally relatively small. All fluids have their own characteristic heat capacity the value of which is well documented. It follows, therefore, that if the flowmeter is operated in a constant temperature mode, then Cp will be relatively constant for any given fluid, and that the output will be a function of the mass flow for the particular fluid being measured.

When operating a heated conduit type thermal flowmeter in a constant power mode and measuring the change in temperature, it will be appreciated that the larger the temperature change the greater the sensitivity of the signal. A typical constant power flowmeter using thermocouples to sense temperature requires a 213° C. temperature differential for a 10 mvdc output. When operating a heated conduit type thermal flowmeter in a constant temperature mode and measuring the change in power, it is only necessary that the temperature differential be of sufficient magnitude to provide a stable error signal capable of maintaining adequate control. In a typical design, a 25° C. temperature differential provides approximately a 1 mvdc signal, which is adequate to hold the temperature constant as hereinafter will be explained. While this already represents an order of magnitude reduction in $\Delta t$ as compared with a constant power flowmeter, even lower temperature differentials are practical.

The lower operating temperature of the constant temperature flowmeter significantly reduces the movement of air surrounding the outside of the heated conduit caused by thermally induced convection currents. In the constant power flowmeter with its higher conduit temperature, this movement of air randomly affects the output of the temperature sensors causing false flow indications, which are most noticeable when the position of the flowmeter is changed.

Figure 2:
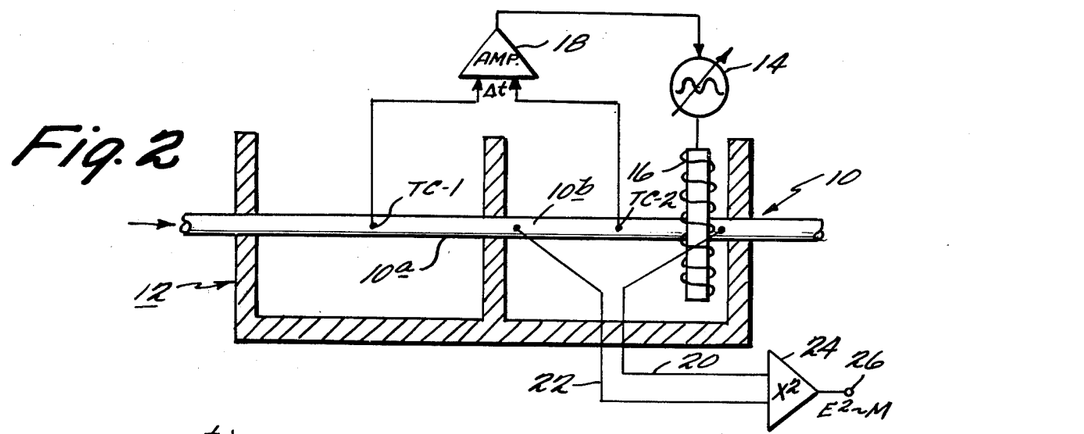
FIG. 2 is a schematic drawing, partially in section, illustrating a first embodiment of the invention.

FIG. 2 shows a first embodiment of the present invention in which a conduit 10 through which a fluid flows is divided into two portions 10a and 10b by thermally massive and electrically conductive heat sink 12. Power is inductively coupled into portion 10b of the conduit by an adjustable source 14 and wound toroid 16 thereby raising the temperature of portion 10b, and that of any fluid contained therein, above ambient. The fluid within the conduit 10 is in thermal equilibrium with the conduit throughout its length. One thermocouple temperature sensor TC-1 is formed at the junction of the unheated portion 10a of the conduit and an attached conductor of a dissimilar material, and a second thermocouple temperature sensor TC-2 is formed at the junction of the heated portion 10b of the conduit and an attached conductor of a dissimilar material.

Figure 3:
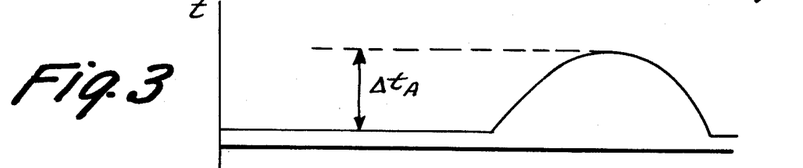
FIG. 3 is a plot of temperature taken along the conduit of FIG. 2 with the fluid entering the conduit being at a temperature the same as that of the heat sink.

In a simplified case, the temperature of the heat sink 12, the unheated portion 10a of the conduit, temperature sensor TC-1 and the incoming fluid are in equilibrium. The effect of inductively coupling energy to a portion 10b of the conduit whose ends are held at a fixed temperature by the heat sink is to create temperature variations along the conduit, as shown in FIG. 3, thus establishing a temperature difference, even at zero flow, between the incoming fluid sensed by TC-1 and the heated fluid sensed by TC-2. This difference is designated in FIG. 3 as $\Delta t_A$.

Figure 4:
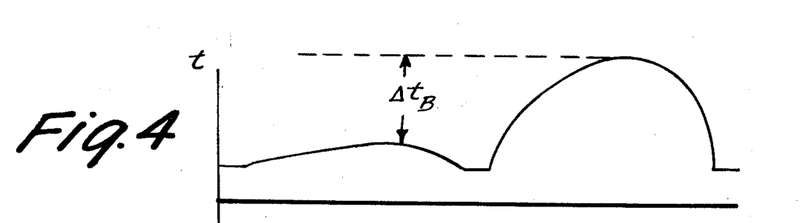
FIG. 4 is a plot of temperature taken along the conduit of FIG. 2 with the fluid entering the conduit being at a temperature above that of the heat sink.

Should the temperature of the incoming fluid initially be different from that of the heat sink 12, then they will in the long run reach some intermediate equilibrium temperature. In the short run, the unheated portion 10a of the conduit, because of its much smaller thermal mass, will have a temperature variation as shown in FIG. 4 until such time as the fluid and heat sink reach their new equilibrium temperature. In a like manner, the heated portion 10b of the conduit will also follow changes in the fluid temperature, such changes being in addition to the temperature variation established by the inductive heating. The net result is to maintain a temperature difference $\Delta t_B$. This difference is equal to $\Delta t_A$, so it can be appreciated that the present invention compensates for changes in temperature of the incoming fluid.

As can be seen in FIG. 2, temperature sensor TC-2 is preferably attached to the midpoint of the heated conduit 10b since this approximates the point of maximum temperature on the conduit for a given power input. Sensors TC-1 and TC-2, are connected in a differential arrangement for example, as inputs to differential amplifier 18, to measure $\Delta t$, which initially can be set to any desired value by adjusting the heat input at zero flow. The power required for such initial setting is referred to as the "idle power" and can be biased out of the output signal by conventional means. As fluid begins to move through the conduit, the temperature at TC-1 remains unchanged. However, the temperature at TC-2 is reduced as the fluid carries heat out of the conduit. This also reduces $\Delta t$, and this difference in $\Delta t$ is translated by amplifier 18 into an error signal that calls for additional heat to restore the temperature gradients of the heated conduit, hence $\Delta t$, to its former value. The additional power required therefore is a measure of the mass flowrate of the fluid.

In order to obtain an accurate determination of mass flowrate, it is necessary to measure power delivered to the fluid independently of the electrical losses associated with the power supply and inductive coupling, and the thermal conduction, convection and radiation losses associated with the conduit and heat sink. The power delivered to the heated conduit 10b is a function of the resistance and voltage across the conduit, specifically $P = E^2/R$. If the conduit is constructed of a material having a very small temperature co-efficient, and if it is maintained at a constant temperature differential, its resistance for all practical purposes will be constant and P will be proportional to $E^2$. By means of conductors 20 and 22, the voltage across the conduit portion 10b is applied to a conventional squaring circuit 24 to produce an output at 26 representative of the power delivered to the fluid via portion 10b which output is independent of losses occurring both in the power supply circuit and from inductive coupling. However, not all of the heat supplied to the conduit is transferred to the fluid. There are unavoidable losses due to thermal radiation, convection, and conduction. Typically the conduit operating temperature is only 25° C. above ambient. Radiation losses are then negligible. Similarly, convection losses are minimized and are relatively constant. Conduction down the circuit portion 10b to the heat sink 12 accounts for the principal losses. However, if the conduit is maintained at a constant temperature difference above the heat sink, and if the heat sink has sufficient thermal mass so that its temperature is unaffected by either the heat flow from the conduit or the induced heating current, then the conductive heat loss will be constant, and unaffected by the amount of power supplied to the conduit. Consequently, the total amount of heat (power) loss by radiation, convection, and conduction is constant and is independent of the amount of power delivered to the conduit. Thus, it can be treated the same as idle power and biased out of the voltage output signal by conventional means.

Figure 5:
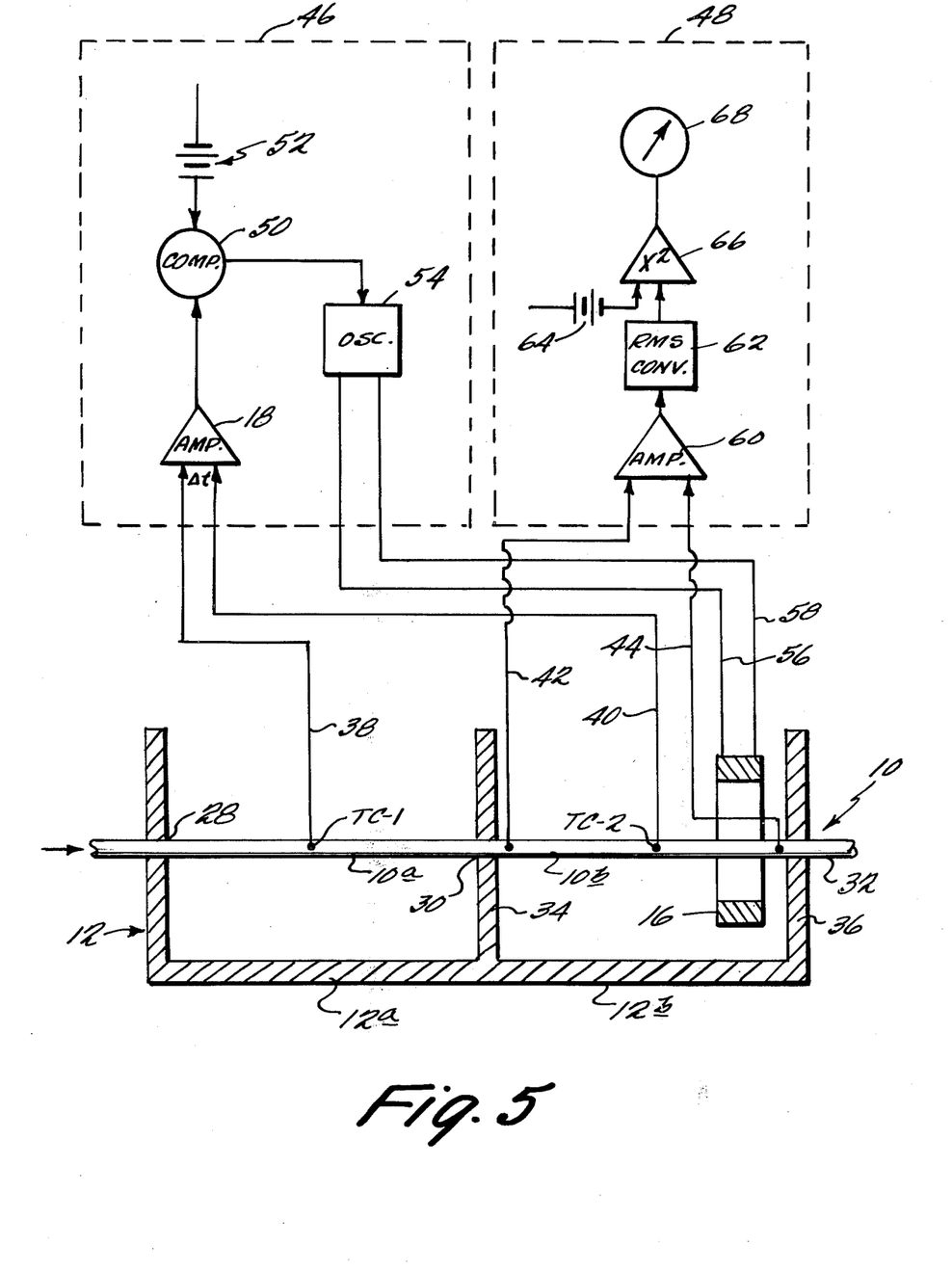
FIG. 5 is a schematic drawing, partially in section, illustrating a second (and preferred) embodiment of the invention.

FIG. 5 illustrates a preferred embodiment of the present invention including the associated electrical circuitry. A thermally and electrically conductive conduit 10 is attached to an electrically conductive and thermally massive heat sink 12 at 28, 30 and 32. Partition 34, part of heat sink 12, effectively divides the conduit into two not necessarily equal sections 10a and 10b and separates the heat sink into portions 12a and 12b. A total transformer inductively couples power in a secondary loop consisting of conduit section 10b, heat sink end wall 36, heat sink portion 12b, and heat sink partition 34. No power is coupled to conduit section 10a. Metallic conductors 38 and 40 of a material different from the conduit, are attached to conduit 10 (for example, by welding) at points located preferably, but not necessarily, at the center of conduit sections 10a and 10b, thus forming thermocouple junctions TC-1 and TC-2 with the conduit. Conductors 42 and 44 are attached symetrically to conduit section 10b preferably as close to the ends of the conduit section 10b as practical to maximize the voltage signal obtained therefrom. It is desirable that these conductors 42 and 44 be of the same material as the conduit so that they do not form a thermocouple with the conduit. However, if the conductors are of a material different from the conduit, the resultant thermocouple voltages will be small and self-cancelling if the conductors are symmetrically placed near the end of the conduit section 10b. Fluid passes unobstructed through the conduit 10 in the direction shown by the arrowhead and is in thermal contact with the conduit throughout its length. The circuitry associated with the flowmeter consists of two parts, the constant temperature servo loop contained within the block designated as 46 and the power measuring circuit grouped within block 48. The differences in electrical outputs from the thermocouples TC-1 and TC-2, formed by the conduit 10 and conductors 38 and 40, represents Δt and is amplified by 18. The output of amplifier 18 is compared by comparator 50 to a fixed reference voltage 52 which is equal to the amplified output of the thermocouples at the value at which Δt is desired to be held constant. Any error signal developed by comparator 50 is applied to a voltage controlled power oscillator 54 so as to alter the AC power supplied by means of conductors 56 and 58 to the toroidal transformer 16 which heats the conduit section 10b. The AC power is of appropriate magnitude to restore Δt to its desired constant value at any flowrate within the design range of the flowmeter. The voltage difference between the ends of conduit section 10b is coupled by conductors 42 and 44 to amplifier 60 and then to an RMS converter 62 so as to develop the DC equivalent of the AC voltage output from amplifier 60. A fixed DC voltage from source 64, which voltage is representative of the idle power plus fixed losses, serves as a bias which together with the output of converter 62 are applied as inputs to a conventional squaring circuit 66 in which the difference between the inputs is squared and scaled. The output of circuit 66 is proportional to the mass flow of the fluid and is displayed on a suitable readout device 68.

Figure 6:
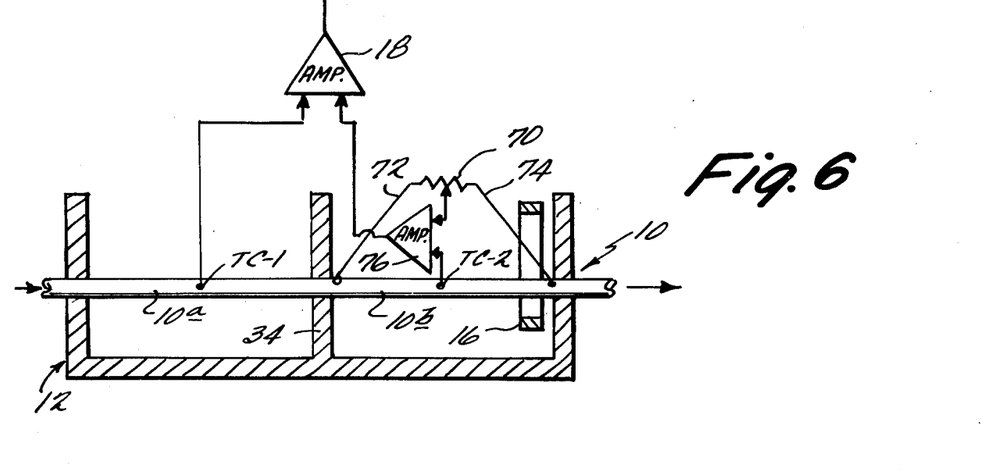
FIG. 6 is a schematic drawing, partially in section, of a third embodiment of the invention.

FIG. 6 illustrates a further embodiment of the invention wherein the unwanted AC signal picked up by thermocouple TC-2 is nulled by the bridge circuit consisting of the conduit section 10b, the thermocouple TC-2 and a potentionmeter 70 whose resistance is much larger than that of the conduit section 10b (so that is consumes negligible power), the potentiometer including conductors 72 and 74 which attach symmetrically to the extremities of section 10b. A differential amplifier 76, having a high common mode rejection receives inputs from TC-2 and potentiometer 70. The amplifier rejects the AC signal which is common to both its inputs and passes only the DC signal from the thermocouple TC-2. By attaching the potentiometer symmetrically to the extremities of the conduit, no DC signal is present on the potentiometer tap to interfere with the temperature measurement of the thermocouple. The pure DC signal from the differential amplifier 76 is substracted from the pure DC signal from the reference thermocouple TC-1 by the differential amplifier 18 the output of which represents the temperature difference between the two thermocouples. It would be obvious to one skilled in the art, that amplifiers 18 and 76 could be a signal amplifier and that the conductors 72 and 74 could be the voltage measuring conductors 20 and 22 in FIG. 2 previously described. Of course, it will be understood that the components for controlling power to conduit section 10b and for squaring the voltage difference between the ends of the section 10b have been omitted merely for convenience of illustration.

Figure 7:
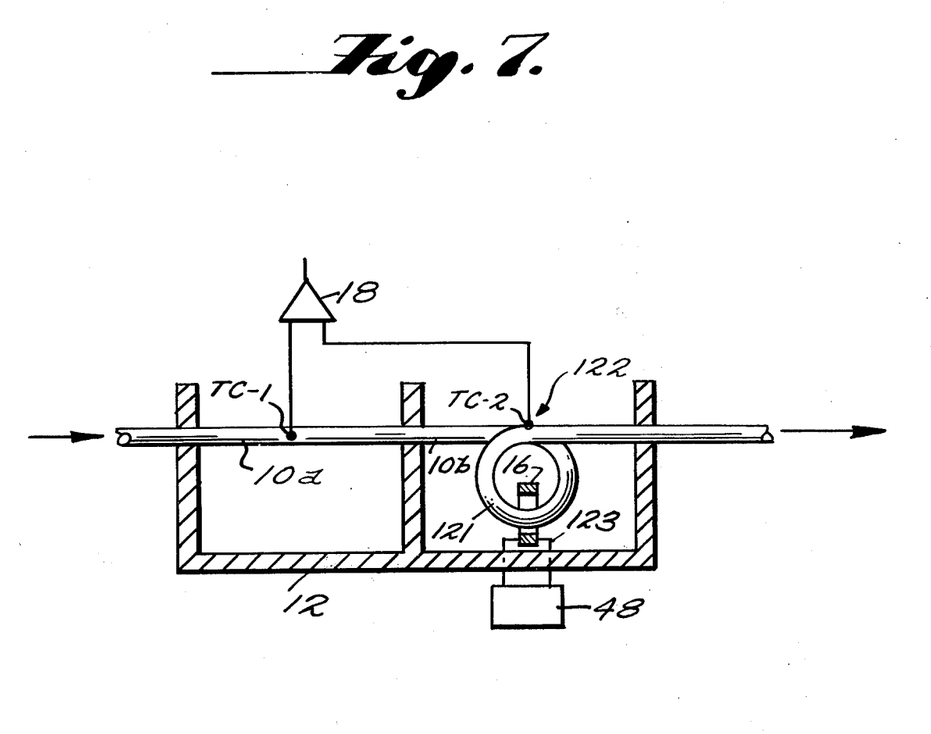
FIG. 7 is a schematic drawing, partially in section, of a fourth embodiment of the invention.

FIG. 7 illustrates a further embodiment of the invention wherein thermocouple TC-2 does not pick up any of the unwanted A.C. heating signal. Conductor 10b is bent in the form of a loop 121. The loop is closed electrically by joining the outer walls of the conduit together, (as by welding or similar techniques) at 122, but flow still passes through the conduit from inlet to outlet. Thermocouple TC-2 is attached at the junction 122 of the loop. There is now no A.C. potential between the thermocouples TC-1 and TC-2. The loop further improves the performance of the flowmeter by enhancing the mixing of fluid, thus promoting thermal equilibrium between the fluid and the conduit. An additional winding 123 on the toroidal coil 16 provides a voltage proportional to the heating power supplied to the conduit, which is transformed into an output signal proportional to mass flow by circuitry 48 previously described in connection with FIG. 5.

Figure 8:
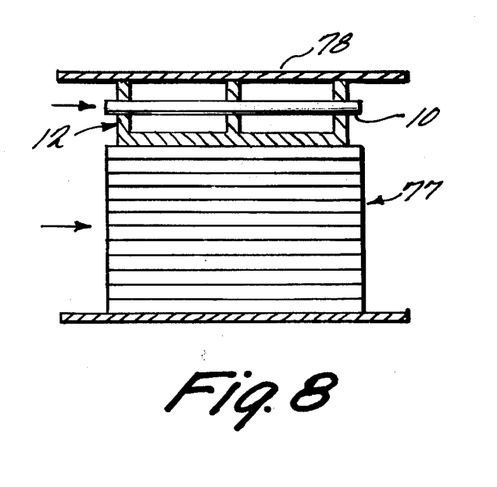
FIG. 8 is a schematic drawing, partially in section, of a fifth embodiment of the invention.

The range of the constant temperature flowmeter of the type which have been described can be increased as shown in FIG. 8 by placing additional conduits 77 of similar dimensions in shunt around the active measuring conduit 10, said additional conduits, which need not be heated, forming a stable and linear flow divider. All of the conduits are retained within a larger pipe-like housing 78. Since fluid conditions are the same (except for the small temperature differential of the active conduit 10 which can normally be neglected), the mass flow through each of the conduits is the same, and the total flow is the measured flow through the active conduit times the total number of conduits.

Figure 9:
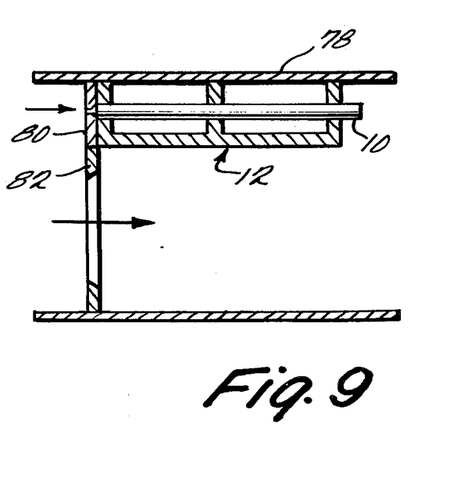
FIG. 9 is a schematic drawing, partially in section, of a sixth embodiment of the invention.

Another method of increasing the flow range of the constant temperature flowmeters is shown in FIG. 9 and consists of placing a first restrictive element 80 in series with the flowmeter's active measuring conduit 10, said restrictive element being of a form wherein the pressure drop across the element varies as the square of the velocity through the element, such as occurs with an orifice plate, venturi tube, etc. The pressure drop across the conduit 10 must be much smaller than that across the first restrictive element. A second restrictive element 82 having a pressure drop which also varies as the square of velocity therethrough, but not necessarily of the same form as the first restrictive element, is placed in shunt with the first restrictive element 80 and the conduit 10 thus forming a stable and linear flow divider. Since fluid conditions are the same for each restrictive element, said elements responding similarly, and since the conduit itself has negligible influence on the flow, and since the velocity of approach factors can be made similar, the total flow is that measured by the flow through the conduit times a fixed ratio depending on the throat area of the first and second restrictive elements.

Figure 10:
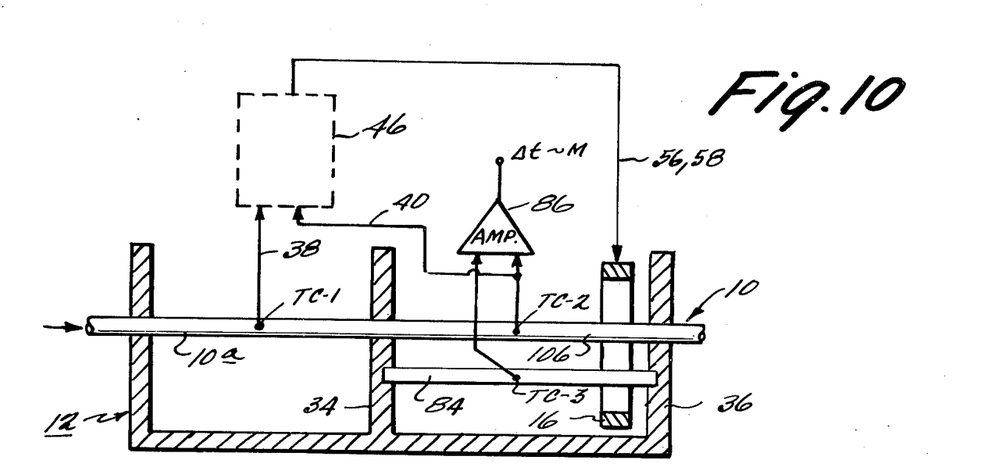
FIG. 10 is a schematic drawing, partially in section, of a seventh embodiment of the invention.

In the various embodiments of the invention previously described, an indication of power requirements is obtained by squaring the voltages across the conduit section 10b. This may also be obtained by multiplying the voltage difference between the extremities of conduit section 10b by the current in the conduit section ($P = EI$). Another method is shown in FIG. 10 wherein an additional conduit section 84 is placed in parallel with the heated section 10b of the original conduit 10 between end wall 36 and partition 34 of the heat sink 12. Section 84 is in the inductive circuit and thus heated, but the ends of section 84 are sealed so that no fluid can pass therethrough. Temperature sensor TC-3 is attached to the conduit section 84, and another sensor TC-2 is attached to the conduit section 10b. The two temperature sensors are connected to a differential amplifier 86 of the output of which represents the difference in temperature between the two conduit sections. At zero flow the temperatures of both sections are the same and the output of the differential amplifier 86 is zero. As fluid moves through the conduit 10, the constant temperature servo circuit 46, previously described with respect to FIG. 5, controls the power delivered to the conduit section 10b and 84 until section 10b is restored to its desired temperature. Since the conduit sections 10b and 84 are identical and in parallel, the power divides evenly between them. Power applied to conduit section 84 increases its temperature since it has no fluid movement to remove the heat. Consequently, a difference in temperature exists between the two conduit sections 10b and 84 which is proportional to the power necessary to maintain a constant $\Delta t$ between the heated and unheated sections 10b and 10a of conduit 10. The output of amplifier 86 is thus proportional to the mass flow of the fluid in conduit 10.

Figure 11:
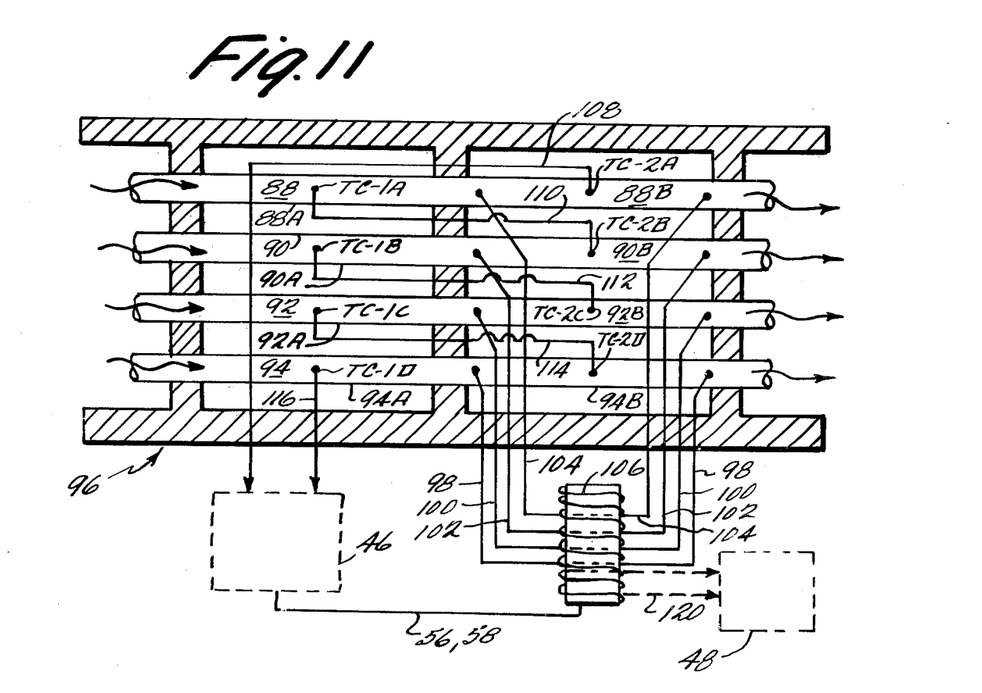
FIG. 11 is a schematic drawing, partially in section, of an eighth embodiment of the invention.

FIG. 11 illustrates another form of the present invention in which a multiple arrangement of conduits and thermocouples provides an adequate electrical signal proportional to the temperature difference in the fluid at substantially lower conduit temperatures. Multiple conduits (88, 90, 92 and 94) are joined to a thermally conductive but electrically non-conductive heat sink 96. Alternatively, the heat sink 96 can be electrically conductive if the conduits are separated from the heat sink by a thermally conductive but electrically insulative material. The heat sink further divides each conduit into two sections (88A and 88B, 90A and 90B, etc.), the second group of which (identified by the suffixes B) is inductively heated by attaching conductors 98, 100, 102 and 104 to the extremities of said conductors through an inductive coil 106. Conductors 108, 110, 112, 114 and 116 of a material different from the conduits, form thermocouple junctions (TC-1A to TC-1D and TC-2A to TC-2D) with the conduits 88, 90, 92 and 94, said thermocouple junctions thereby being electrically joined in series. The conductors are arranged such that conductor 110 attaches the unheated conduit section 88A and the heated conduit 90B; conductor 112 attaches to the unheated conduit section 90A and to the heated conduit section 92B, etc. One end of each conductor 108 and 116 is connected to a differential amplifier such as that employed in circuit 46 of the FIG. 5 embodiment, the output of said amplifier being proportional to the sum of the outputs of each individual thermocouple. The same total flow requires the same total power. However, both the flow and power are divided substantially equal among the conduits. The power can be measured as described with reference to the embodiments of FIGS. 2 and 5 or by winding an additional secondary 120 on the inductive coil 106 to obtain a voltage proportional to that induced across the conduits. Such a voltage would still be independent of any losses associated with the power supply or the coil, and any error introduced by the difference in coupling would be small and proportional. By squaring the voltage by means such as circuit 48 described with reference to FIG. 5, an output is produced which is representative of the power delivered to the fluid, and thus it also is representative of the mass flowrate.

In addition to the advantage of a lower temperature differential, the arrangement just described also has the advantage of increased range. The maximum range of a single conduit flowmeter is limited to flowrates in which the conduit and the fluid rate are substantially in thermal equilibrium. Thus, the maximum range of a multiconduit flowmeter is increased in direct proportion to the number of conduits. It can be seen that this embodiment could incorporate loops in the heated conduit sections as previously described with respect to FIG. 7.

Figure 12:
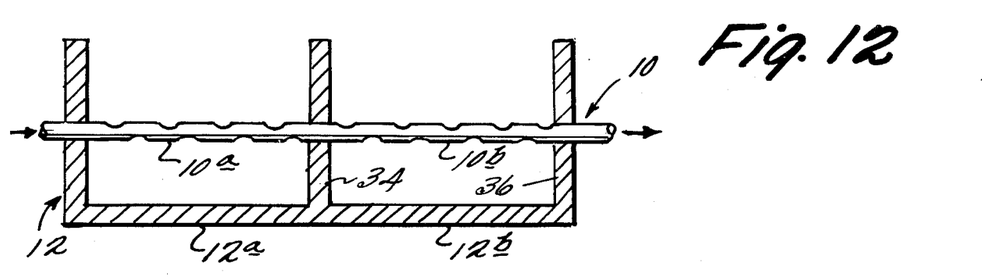
FIG. 12 is a schematic drawing, partially in section, illustrating an alternative conduit which may be used in the several embodiments of the present invention.

FIG. 12 shows a modification which may be utilized in the various embodiments of the invention which have been described. More particularly, the walls of the conduit 10 may be "dimpled" or otherwise roughened to enhance turbulence (mixing) in the fluid, thus promoting thermal equilibrium between the fluid and the conduit.

Among the advantages of the present invention is the fact that fluid passes unobstructed through the conduits. There are no heaters or sensors protruding into the flow stream. It is also possible in some embodiments of the invention for the conduit 10 to be a straight piece of tubing, which would have the following advantages: (1) the conductor is much less susceptible to fouling by dirty fluids, (2) that its condition can be easily determined by visually examining the conduit from either end, and (3) that if fouling does occur, it can be cleaned without damaging the sensors in any way by pushing a cleaning rod through the entire length of the conduit. Additionally, the fluid comes in contact only with the conduit and not with the heat sink or the sensor wires. Connection of the conduits to an external line can be made by direct welding, or any other suitable method. This means that the flowmeter can be used to measure fluids that might attack materials, such as silver solder, which are commonly used in previously known designs.

What is claimed is:

1. Apparatus for measuring fluid flow, comprising:
   at least one conduit through which fluid passes;
   a heat sink through which said conduit projects, said heat sink including a partition for separating said conduit into first and second conduit portions;
   means for heating said first portion of the conduit, said heat sink preventing the second portion of the conduit from being heated when said first portion is heated;
   means joined to the exterior of said conduit at said first and second conduit portions for sensing the temperature of the conduit at said portions and for producing output signals representative of the temperatures sensed;
   means responsive to said output signals produced by the temperature sensing means for varying power supplied to said heating means in order to maintain a constant difference in temperature between two of said sensing means; and
   means for developing an additional output signal proportional to the power supplied to the heating means and representative of the mass flowrate of fluid passing through said conduit.

2. Apparatus as set forth in claim 1, wherein each of said temperature sensing means comprises a thermocouple.

3. Apparatus as set forth in claim 2, wherein said thermocouple is formed by a conduit of one material being joined to a conductor of a dissimilar material.

4. Apparatus as set forth in claim 1, wherein said heat sink is electrically conductive and includes an end wall and a body portion which joins the partition to the end wall, said first conduit portion extending between the end wall and the partition.

5. Apparatus as set forth in claim 4 further comprising:
   an additional conduit closed at its ends and also extending between the end wall and the partition;
   means on the exterior of said additional conduit for sensing its temperature, said heating means being arranged to also heat said additional conduit; and
   said means for developing an additional output signal representative of the mass flowrate through the first-mentioned conduit being responsive to the output signals produced by the temperature sensing means of the first conduit portion and the temperature sensing means on the exterior of the additional conduit.

6. Apparatus as set forth in claim 5 wherein the means for heating the first conduit portion includes means for inducing current in an electrical loop comprising the first conduit portion together with the partition, the body portion and the end wall of the heat sink.

7. Apparatus as set forth in claim 6, wherein said current inducing means includes a toroid surrounding the first portion of said conduit and wherein the means for developing said additional output signal includes an additional winding on said toroid.

8. Apparatus as set forth in claim 1 wherein the means fo varying power supplied to the heating means comprises:
   a variable power supply; and
   means responsive to the difference between the output signals produced by the temperature sensing means at said first and second conduit portions for controlling said power supply.

9. Apparatus as set forth in claim 8 wherein said means responsive to the difference between the output signals includes:
   a differential amplifier to which the output signals are connected as inputs;
   a comparator joined to the differential amplifier for comparing the output of the amplifier with a reference signal to produce a control signal; and
   means for controlling said control signal to said variable power supply.

10. Apparatus as set forth in Claim 8 wherein said means responsive to the difference between the output signals includes;
    a first differential amplifier having a pair of inputs, one of said inputs being the output signal produced by the temperature sensing means at the second conduit portion and the other input being the output of a second differential amplifier, said second differential amplifier having as inputs the output signal produced by the temperature sensing means at the first conduit portion and a voltage taken from a resistor connected across the extremities of said first conduit portion.

11. Apparatus as set forth in claim 1, wherein the means for heating the first conduit portion includes means for supplying AC to said first conduit portion and wherein the means for developing an additional output signal proportional to the power supplied to the heating means includes:
    means for detecting the AC voltage difference between separated points along said first conduit portion; and
    circuit means for squaring the magnitude of said AC voltage difference.

12. Apparatus as set forth in claim 11 wherein the location of the separated points along the first conduit portions are the extremities of said portion.

13. Apparatus as set forth in claim 11 further comprising:
    conversion means between the AC voltage difference detection means and said squaring means for converting said AC voltage difference to a DC voltage proportional to the AC voltage difference between said separated points.

14. Apparatus as set forth in claim 13 wherein said squaring circuitry has supplied as inputs thereto the DC voltage developed by said conversion means and voltage from a reference source.

15. Apparatus as set forth in claim 14 further comprising:
   scaler means connected to the output of the squaring circuitry for producing an output proportional to the mass flowrate of fluid.

16. Apparatus as set forth in claim 1, further comprising:
   at least one additional conduit connected in parallel with said first-mentioned conduit and through which fluid also passes, said additional output signal developed being proportionally representative of the mass flowrate of the fluid passing through all of said conduits.

17. Apparatus as set forth in claim 1 further comprising:
   a first restrictive element connected in series with said conduit; and
   a second restrictive element connected in parallel with said first restrictive element and said conduit, each of said restrictive elements developing a pressure drop which is proportional to the square of the velocity of fluid passing through the element.

18. Apparatus as set forth in claim 1 wherein said conduit is provided with an interior wall having a roughened surface to enhance turbulence of fluid passing therethrough.

19. Apparatus as set forth in claim 1, wherein said first portion of the conduit is formed to include a loop through which said fluid passes, said loop being electrically closed at a junction point to which the temperature sensing means of the first conduit portion is joined.

20. Apparatus as set forth in claim 1, wherein a plurality of conduits, through which fluid passes, project through said heat sink and wherein said partition separates said plurality of conduits into first and second portions, said apparatus further comprising:
   means for heating the first portion of each of said conduits, each of said first portions containing one of said temperature sensing means and each of said second conduit portions containing another of said temperature sensing means;
   means for connecting each of said temperature sensing means in series;
   means responsive to the output signals produced by the series connected temperature sensing means within said first and second conduit portions for varying powers supplied to said heating means in order to maintain constant the difference in temperature detected by the first and last of said series connected sensing means; and
   means for developing an additional output signal proportional to the power supplied to the heating means and representative of the mass flowrate of the fluid passing through said conduits.

21. Apparatus as set forth in claim 20, wherein said means for connecting the temperature sensing means in series includes:
   a connection between the sensing means located within the first conduit portion of one conduit and the sensing means located within the second conduit portion of an adjacent conduit.

* * * * *